(12) United States Patent
Simpson

(10) Patent No.: US 9,924,827 B2
(45) Date of Patent: Mar. 27, 2018

(54) COLD COFFEE BREWING DEVICE AND METHODS THEREOF

(71) Applicant: Toddy, LLC, Fort Collins, CO (US)

(72) Inventor: Strother Simpson, Round Top, TX (US)

(73) Assignee: TODDY, LLC, Fort Collins, CO (US)

( * ) Notice: Subject to any disclaimer, the term of this patent is extended or adjusted under 35 U.S.C. 154(b) by 0 days.

(21) Appl. No.: 14/814,429

(22) Filed: Jul. 30, 2015

(65) Prior Publication Data

US 2016/0183713 A1    Jun. 30, 2016

Related U.S. Application Data

(60) Provisional application No. 62/030,821, filed on Jul. 30, 2014.

(51) Int. Cl.
*A47J 31/06* (2006.01)
*A23F 5/26* (2006.01)
*A47J 31/44* (2006.01)

(52) U.S. Cl.
CPC .......... *A47J 31/0605* (2013.01); *A23F 5/262* (2013.01); *A47J 31/0615* (2013.01); *A47J 31/446* (2013.01)

(58) Field of Classification Search
CPC .. A47J 31/44; A47J 31/46; A47J 31/41; A47J 31/06; A47J 31/467; A47J 31/4407; A47J 31/00; A47J 31/02; A47J 31/14; A47J 31/16; A47J 31/3628; A47J 43/24; A47J 36/08; A47J 36/20; A47J 31/446; A47J 31/0615; A47J 31/0626; A23F 3/18; A23F 5/262; A23F 5/26; F26B 5/08
See application file for complete search history.

(56) References Cited

U.S. PATENT DOCUMENTS

| | | | | |
|---|---|---|---|---|
| 1,767,544 | A * | 6/1930 | Miller | A47J 31/06 210/318 |
| 2,299,809 | A * | 10/1942 | Ershler | A47J 31/44 126/377.1 |
| 5,190,653 | A * | 3/1993 | Herrick | A47J 31/06 210/282 |
| 2011/0014340 | A1* | 1/2011 | Spitzley | A47J 31/20 426/433 |

* cited by examiner

*Primary Examiner* — Erik Kashnikow
*Assistant Examiner* — Hong T Yoo
(74) *Attorney, Agent, or Firm* — William W. Cochran; Cochran Freund & Young LLC

(57) ABSTRACT

A coffee brewing device, such as a cold coffee brewing device and related methods are disclosed. The device includes a container, a supported horizontal plate that holds filter paper in place, and a spigot below the horizontal plate. Coffee grounds are placed on the filter, then water is added to the container such that minimal disturbance of the coffee ground bed occurs. When the spigot is opened, liquid is removed in a north/south (up/down) direction through the coffee ground bed. The coffee ground bed serves as a first filter, the filter serves as a second filter, and the chamber below the horizontal plate serves as a coalescing chamber where sediment drops out thus serving as a third filter. The resulting liquid dispensed from the spigot is amber in color and clear.

10 Claims, 3 Drawing Sheets

COLD COFFEE BREWING DEVICE AND METHODS THEREOF

This application claims priority to U.S. provisional application Ser. No. 62/030,821, filed. Jul. 30, 2014, incorporated by reference in its entirety.

TECHNICAL FIELD OF THE INVENTION

This invention relates to a device for cold brewing coffee as well as methods of cold brewing coffee and methods of manufacture.

BACKGROUND

Cold coffee brewing is a growing segment of the coffee industry. Cold brewing provides a rich liquid coffee extract that, when diluted with water or dairy, can be smoother and less bitter than traditional high temperature extraction methods because the latter can leach bitter components into the coffee, and the resulting liquid coffee is of a significantly higher pH.

In addition, prior commercial cold brewing systems have a number of problems that would be desirable to improve upon. For example, existing cold brewing devices channel coffee grinds north and south and drain through a felt-type filter. In these systems the filters tend to blind (clog) during draining. Some devices use a filter bag that is prone to breakage/spillage of coffee grounds as well as prone to produce air pockets in the coffee grounds that leads to weak and inconsistent extract. Furthermore, some systems use a one filter stage tend to clog, allow fine sediment to blend into the final extract, and do not completely saturate coffee thus producing an inconsistent coffee with lots of sediment.

SUMMARY OF THE INVENTION

This invention provides one or more solutions to the omissions and/or deficiencies described above.

In one broad respect, this invention is a coffee brewing device, comprising: a container made of food-grade material that is capable of holding a quantity of water, wherein the container has a height that is greater than a width of the container. The device includes a first horizontal plate positioned above the base of the container. The first horizontal plate has a shape substantially coextensive with the shape of the container at the height at which the first horizontal plate is positioned. The plate includes a plurality of first holes of a size and number effective to permit adequate flow of water through the plate during operation of the device. The device includes a rigid component which supports the plate above the bottom of the container. For example, the container can include at least one protrusion (or ledge) on the interior of the container configured to hold and position the first horizontal plate in place during use. This ledge/protrusion may be referred to as a recess. A filter is laid upon the plate so that it abuts the first horizontal plate. Alternatively, the device can include a table with legs which supports the plate and has an opening to permit flow of fluid vertically through the holes in the plate. Likewise, the device can include a tube configured to support the plate above the bottom of the container. The filter may be a simple paper filter. Alternatively, the filter can be a synthetic polymeric material. Also, the filter can be in the form of a pouch or envelope which is configured to hold the first horizontal plate, with the filter thus being held in place by the plate and recess. The paper filter is shaped to be substantially coextensive with the first horizontal plate. The paper filter has a plurality of holes that have a smaller average diameter as compared to the average diameter of the plurality of holes of the first horizontal plate. The device includes an outlet spigot positioned on the exterior of the container below the position of the first horizontal plate and a position above the base of the container configured such that the outlet spigot intersects the side of the container at a point above where sediments accumulate on the bottom of the container during use of the device. The spigot can optinally include a mesh filter. The device can optionally include a second horizontal plate and a second ledge to position the second horizontal plate above the first horizontal filter It should be noted that the first horizontal plate and the base of the container form a space, which may be described as a coalescing chamber, which functions to decant liquid away from the sediment that accumulates during brewing and draining (or dispensing) of the liquid from the device.

The device can be used to brew coffee, tea, or other select botanical beverages. The device can be used for either cold or hot brewing of coffee or other beverages; however, the device is particularly adapted to cold brewing coffee.

The device can include one or more of the following elements: a container that has a cylindrical shape, with the base the shape of a circle; a lid; components made of a metal such as stainless steel, a food grade polymer, and combinations thereof; holes of the filter have a size in the range of from about 5 to about 150 microns, in certain embodiments a size in the range from about 10 to about 100 microns; a volume for the container of from about one quart to about 500 gallons, but it should be noted that this device may be even larger, and in one embodiment has a volume less than 20 gallons and in yet another embodiment has a volume 20 gallons or greater; the plate, screen, or the like has holes in the range from $\frac{1}{100}$ inch to $\frac{1}{2}$ inch; one or more additional horizontal plates and a corresponding ledges that are configured to hold additional paper filters; a spigot that includes a mesh filter; a spigot that can have a diameter of for example between $\frac{1}{4}$ inch and 1 inch. The container is sized to have a volume that holds both a given amount of water plus coffee grounds.

In a second broad respect, this invention is a method of brewing coffee, comprising: assembling the device of this invention; placing coffee grounds on the filter; adding water to the container to submerge the coffee grounds; allowing the water to contact the coffee grounds for a period of time; and then opening the spigot to drain the brewed coffee. The water should ideally be added gently to limit the amount of agitation/movement of the coffee grounds positioned on the paper filter. It has been found that the less the coffee ground bed is disturbed during the process, the less fine particulates will move into the coalescing chamber, thus providing a clear liquid with a limited amount of suspended particulates. The device can optionally include a paddle employed by an end user to gently tap the coffee and water mixture to wet any floating coffee particles thus allowing the now-wet particles to fall into the coffee ground bed.

The resulting coffee extract is thus clear and highly finished/polished. Advantageously, the device produces a pure, polished, concentrated coffee extract that has less sediment and is more polished compared to that produced by current commercial devices. The device is convenient for the user. The device allows for total saturation of coffee grinds creating slurry that aides in the brewing and filtration process. In this regard, coffee and water completely saturate, with no dry pockets, producing a consistent finished product. It should be noted that certain current commercial devices, unlike this invention, create dry pockets. That is, in certain current commercial devices 100% of the coffee grinds are not saturated with water thus creating inconsistent batches of finished product.

Advantageously, the device lacks a filter bag that holds the coffee grounds. It should be appreciated that current commercial devices that include a filter bag can be prone to breakage/spillage of coffee grounds. Advantageously, the device channels the coffee so that it gravitates from north to south (up/down) which permits the coffee grounds to act as a filter bed which polishes the finished product. Conversely, certain current commercial devices include a suspended filter bag that forces coffee to drain east, west, north, and south, creating a swirling action that maximizes sediment in the finished product.

Advantageously, the device of this invention includes multiple filter stages that allow for exceptional sediment removal. In particular, the coffee ground bed serves as a first filter bed, the paper filter serves as a second filter, and the coalescing chamber serves as a third filter chamber that permits sediment dropping out of solution, collecting on the base of the container below the spigot. The coalescing chamber, i.e., the third stage, thus serves as a filter trap configured to remove many of the superfine particulates.

In addition, certain current commercial devices channel coffee grinds north and south and drain through a felt-type filter. Disadvantageously, the felt-type filter tends to blind (clog) during draining. The present invention excludes a felt-like filter, thus permitting improved draining and ideally provides no clogging.

Furthermore, the present invention is capable of producing a cold brewed concentrated liquid coffee having a Brix value of 3-9. Brix is significantly higher than certain current commercial devices. It should be appreciated that Brix value quantifies the density value or amount of soluble solids in the brewed liquid.

In one embodiment, the water has an initial temperature of from 32 to 212 degrees Fahrenheit, more typically from 32 to 150 degrees Fahrenheit. Typically, the initial water temperature is approximately room temperature, such as from 50 to about 90 degrees Fahrenheit. In one embodiment, the ratio of water by volume in quarts to coffee grounds by weight in pounds is in the range from 0.5 to 5. For example, seven gallons of water (28 quarts) in combination with 8 pounds of ground coffee has a ratio of 7:2. In one embodiment, the period of time from adding water and coffee to the device to draining at least a portion of brewed coffee from the device is from one to 24 hours.

In another broad respect, this invention is a method of manufacturing a coffee brewing device, comprising: providing a container made of food-grade material that is capable of holding a quantity of water, wherein the container has a height that is greater than a width of the container; providing a first horizontal plate positioned above the base of the container, the first horizontal plate having a shape substantially coextensive with the internal shape of the container at the height at which the first horizontal plate is positioned, and having a plurality of first holes; providing a component to suspend the plate above the bottom of the container such as at least one protrusion (or ledge) on the interior of the container, a tube, a table, or otherwise, configured to hold and position the first horizontal plate in place during use; providing a paper filter that abuts (lies on) the first horizontal plate and which shaped to be substantially coextensive with the first horizontal plate, wherein the paper filter has a plurality of holes that have a smaller average diameter as compared to the average diameter of the plurality of holes of the first horizontal plate; and providing an outlet spigot positioned on the exterior of the container below the position of the first horizontal plate and a position above the base of the container configured such that the outlet spigot intersects the side of the container at a point above point where sediments accumulate during use of the device.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
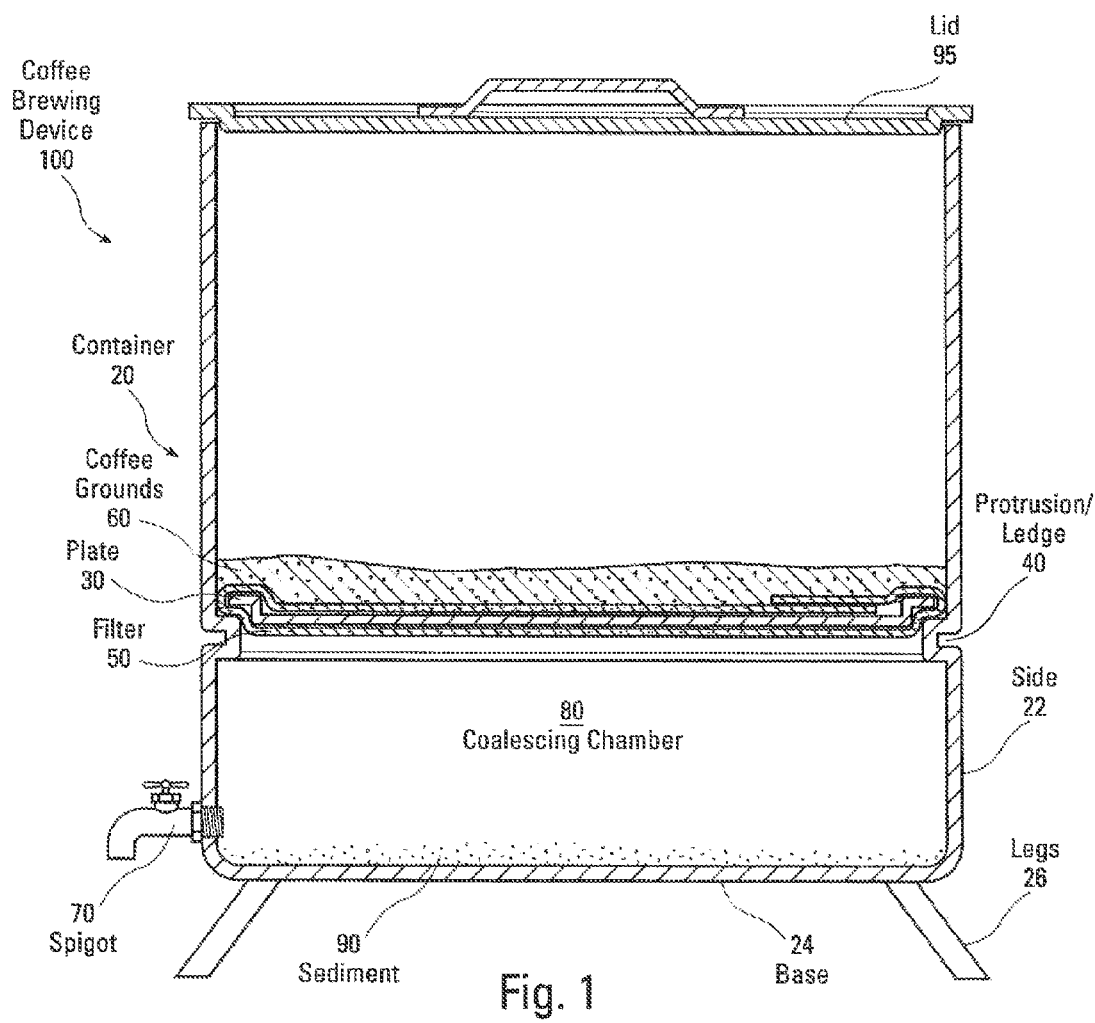
FIG. 1 generally illustrates a cross-sectional view of the device 10 of this invention.

Referring now to FIG. 1, a representative embodiment of the invention is illustrated. FIG. 1 thus shows a container 20 that is configured to hold water. Ideally, the container is made of food-grade material. For example, the container 20 can be made of a metal or alloy such as stainless steel or a food grade polymer. As shown, the container (or "vessel" or other similar term) 20 has a base 24 and sides 22. In one embodiment, the container is cylindrical. In a cylindrical configuration, the sides 22 form a single continuous side.

Figure 3:
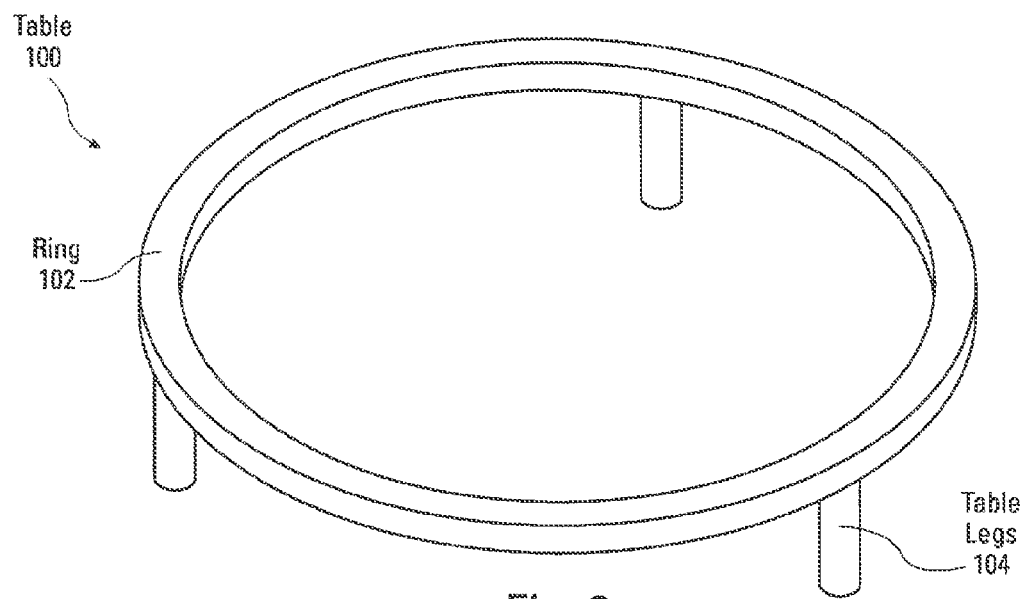
FIG. 3 generally illustrates a table 100 which can function as a ledge in the brewing device of this invention.
Figure 4:
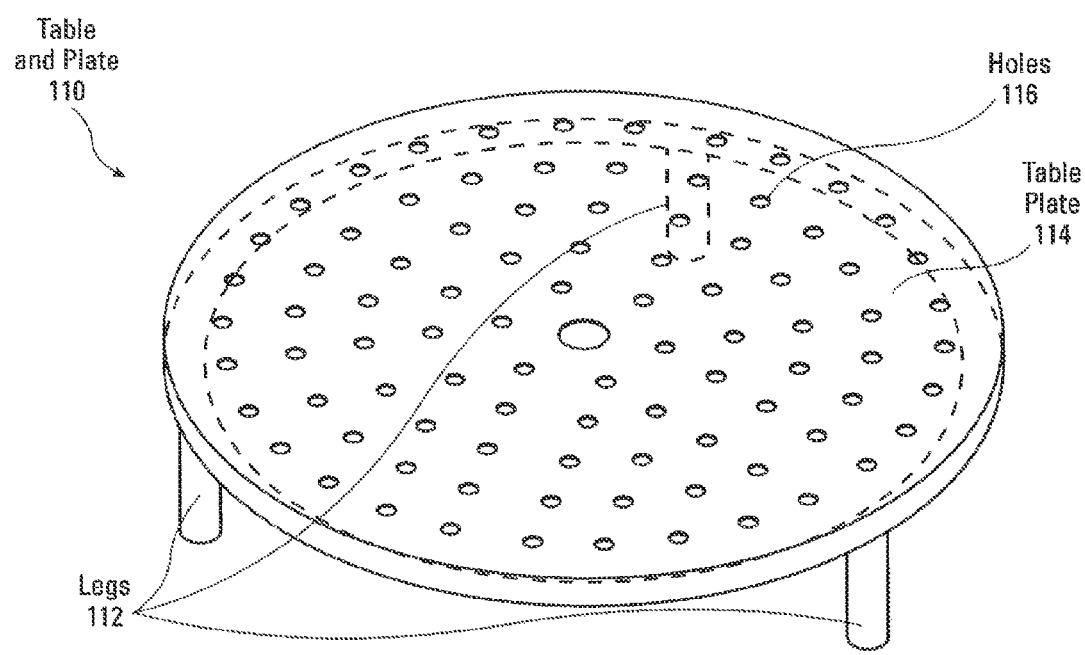
FIG. 4 generally illustrates a plate 110 having built-in legs 112.
Figure 5:
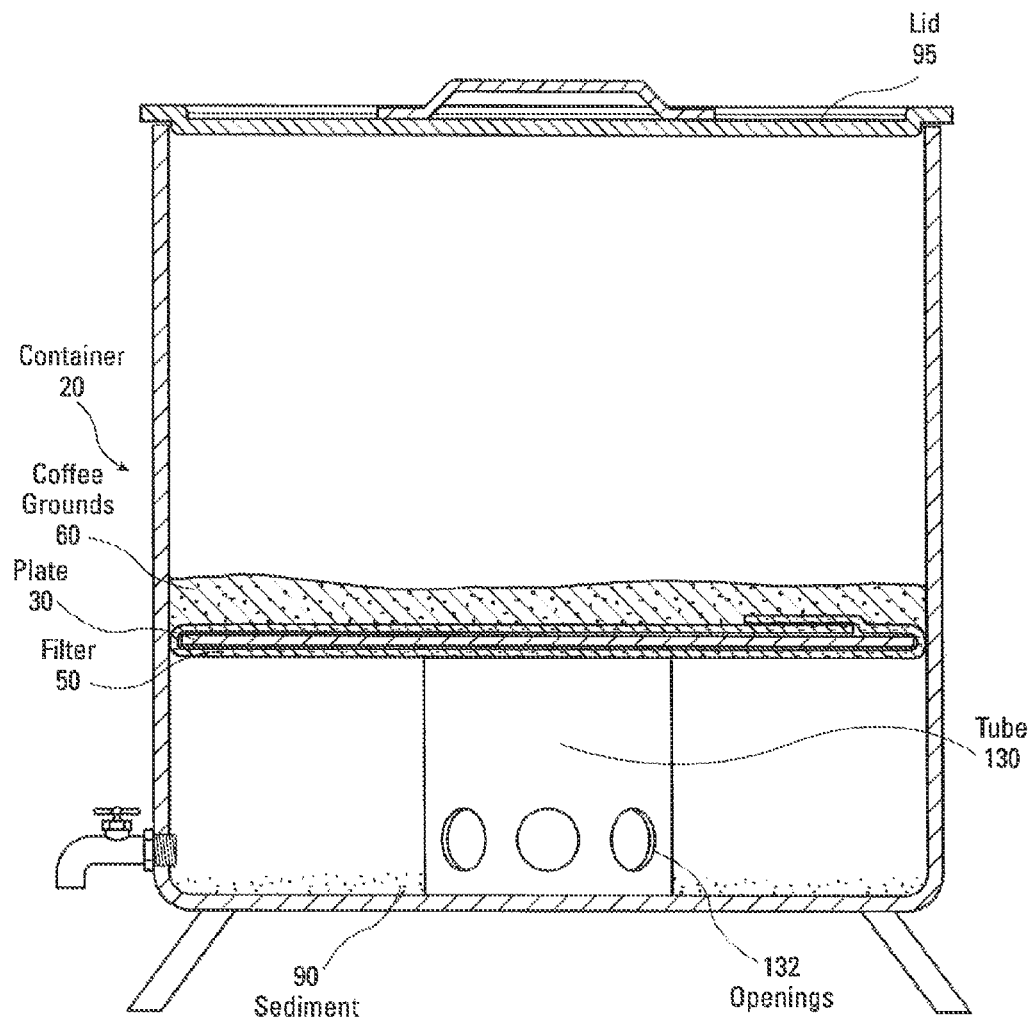
FIG. 5 generally illustrates a device of this invention having a tube 130 that supports the plate 30.

A rigid component in the form of a ledge/protrusion 40 is attached to the sides 22. The ledge serves to hold the horizontal plate 30 in place during use, thus positioning the plate 30 above both the spigot 70 and base 24. The space 80 between the plate 30 and base 24 constitutes a coalescing chamber where sediment 90 drops out below the level of the spigot 70. Sediment collects below the level of the spigot during the brewing and dispensing process. The ledge 40 can be multiple protrusions that together serve to hold the plate 30 in position or can be a continuous band attached to the sides 22. Alternatively, a table 100 as shown in FIG. 3 can be employed in lieu of the ledge 40. The table 100 can include an outer ring size and configured to hold the plate 30 at a given height. Table legs 104 support the ring and hold the ring 102 at a given height above the bottom 24 of the container 20. In another alternative as depicted in FIG. 4, the plate and table are combined into a single structure 110 including a table plate 114 having holes 116 for fluid flow. Legs 112 support the table plate 114 to keep it at a given height above the bottom 24 of the container 20 during the brewing and dispensing process. In still another embodiment, as shown in FIG. 5 the plate 30 can optionally be supported by a tube 130 size and configured to support the plate 30 without tipping or spillage during use. The tube 130 can include openings 132 so that liquid does not become trapped in the tube while dispensing extract from the spigot. In each of these embodiments, the plate 30 serves to hold a paper filter 50 in place. In turn, the paper filter 50 holds the bed of coffee grounds 60 in place. It should be understood that for convenience and/or cost, the filter 50 can be made of paper. However, the filter 50 can be made of other materials, such as being made of polymer or metal in the form of a mesh. In general, the volume of the coalescing chamber 80 is less than the volume of the container 20 above the plate 30.

As illustrated in FIG. 1, the spigot 70, which can be referred to as an outlet, valve, port, or similar term, is attached to the side 22 to provide fluid communication with the coalescing chamber 80. The spigot 70 is positioned so that it connects above the base 24 and in a position above where sediment 90 accumulates. Opening the spigot permits liquid to drain from the container 20 with minimal amounts of sediment exiting the spigot.

The device 10 can include a lid 95, which may be employed during use. In one embodiment, the device 10 includes optional legs 26 that can be attached to the side of the container 20. The legs 26 can be positioned along the side so that the legs do not interfered with operation of the spigot 70. Alternatively, the legs 26 can be attached to the base 24 of the container 20. In another embodiment, the device 10 includes a separate table (not shown) onto which the container 20 rests or into which the container 20 rests.

In one particular embodiment, the brewing container 20 is a 35-quart stainless steel container with a ½" stainless steel spigot 70. A stainless steel filter/plate 30 (for example, a stainless steel screen with holes from 1/100 inch to about ½ inch, and in one embodiment about ¼ inch is fitted 3" from the container's bottom 24. The stainless steel screen/plate 30 is covered with 5-150 micron filter paper, in one embodiment 10-20 micron filter paper 50. Seven gallons of room temperature water is added to eight pounds of ground coffee 60. The ratio of ground coffee to water can be increased or decreased depending on the quantity of finished produce desired by the end user. Typically, about one pound of ground coffee is used per two quarts of water. The size of the container 20 is designed to hold the combined volume of ground coffee and water. Thus, in this particular embodiment, the container 20 has a volume of 35 quarts, which accommodates the seven gallons of water (28 quarts) and the 8 pounds of coffee grounds.

After brewing is deemed by an end user to have been completed, an end user opens brewer valve 70. The liquid coffee gravitates north to south through a coffee ground bed 60 thus filtering and removing much of the coffee sediment in the coffee bed and the filter. In this regard, the coffee grinds form their own filter bed, thus reducing sediment in the final liquid product. Without wishing to be bound by theory, the coffee bed acts in a fashion similar to a charcoal filter.

After the liquid coffee travels through the coffee grounds 60 the liquid is filtered with a 5 to 150 micron filter 50 (and plate 30) and travels to the coalescing chamber 80.

The final stage of filtration is when the liquid coffee travels into the coalescing chamber 80, which functions as a sediment trap. The valve 70 is opened allowing the polished coffee extract to slowly drain, thus allowing the coffee fines 90 (small coffee particulates that are heavier than water) to fall out and collect on the bottom 24 of the brewing container 20 and thus separated from the polished coffee extract drained from the spigot. The container 20 can also be referred to as a brewing vessel.

Figure 2:
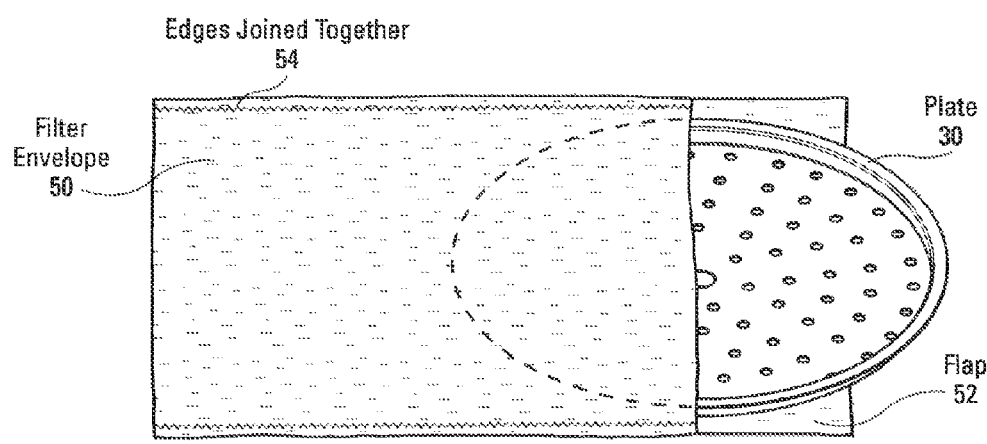
FIG. 2 generally illustrates an envelope style filter 50 that is shaped to hold a plate 30.
Figure 6:
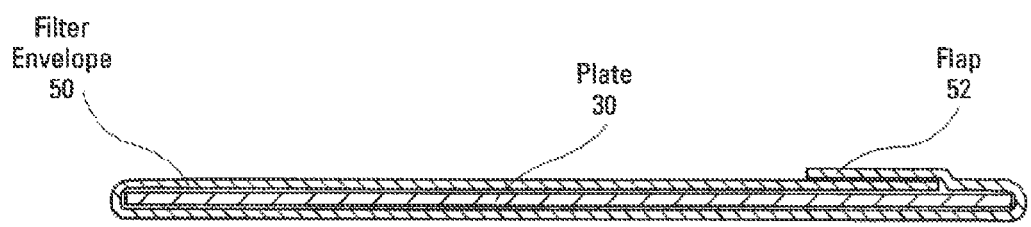
FIG. 6 generally illustrates a cross-sectional view from an end perspective of the envelope style filter 50 of FIG. 2 with plate 30 held therein.

FIG. 2 shows a filter 50 that has been configured to hold a horizontal plate 30. The filter 50 can be made of food grade synthetic polymer. The filter 50 in this configuration has a top and a bottom that have been sewn together at edges 54, heat sealed, or otherwise attached together. The top and bottom can be from the same sheet of polymer that has been folded over and then sealed at the edges. The filter envelope 50 can optionally include a flap 52. Once the plate 30 is inserted into the envelope 50, the resulting assembly can be placed on the ledge 40 or table or tube, with the coffee grounds being then deposited on the filter 50 prior to introduction of the water. The filter can have holes that are sized to have an average size diameter in the range from 5 to 150 microns, and in one embodiment from about 20 to about 120 microns. FIG. 6 shows a cross-sectional view of the plate 30 within the filter envelope 50, including flap 52.

The brewing process of this invention can include dispensing, directly or indirectly, the brewed beverage into cups for immediate use or sealable containers for storage and later sale.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A coffee brewing device, comprising:
   a container made of food-grade material that holds a quantity of water, said container having a base and a side, said side having a height that is greater than a width of said base of said container;
   a ledge located on said side of said container;
   a plate located in a position above said base of said container, on said ledge, said plate having a shape that is coextensive with a shape of said container at a height on said side of said container at which said plate is positioned on said ledge in said container, said plate having a set of first holes;
   a filter having a shape of an envelope with a bottom portion and a top portion that is connected to said bottom portion along sides of said top portion and said bottom portion to form an opening at one end of said envelope that is sufficiently large to allow said plate to be inserted between said top portion and said bottom portion, said filter surrounding said plate when said plate is inserted in said opening so that liquid passing through said plate is filtered twice, once by said top portion of said filter and once by said bottom portion of said filter, said filter having a set of second holes, said set of second holes being smaller than said set of first holes; and
   an outlet spigot positioned on an exterior portion of said side of said container below said position of said plate and in a position above said base of said container so that sediments can accumulate during use of said coffee brewing device and are not dispensed from said spigot.

2. The device of claim 1, wherein the container has a cylindrical shape, said base having a circular shape.

3. The device of claim 1, further comprising a lid.

4. The device of claim 1, wherein said container, said first plate, and said spigot are made of stainless steel.

5. The device of claim 4, wherein said plurality of first holes of said plate have a size in the range of 1/100 inch to 1/2 inch.

6. The device of claim 5, wherein the container has a volume of from about 1 quart to about 500 gallons.

7. The device of claim 6, wherein the spigot has a diameter of between 1/4 inch and 1 inch.

8. The device of claim 7, wherein said filter is a paper filter or a filter made of synthetic polymer and has holes in the range of 5 to 150 microns.

9. The device of claim 1, wherein said ledge comprises at least one protrusion on an inside portion of said side of said container which holds and supports said plate above said base.

10. The device of claim 1, wherein said filter further comprises:
   a flap extending from said bottom portion or said top portion of said filter that can be folded to cover an edge portion of said plate.

\* \* \* \* \*